Patented Oct. 13, 1936

2,057,016

UNITED STATES PATENT OFFICE 2,057,016

LIGHT-SENSITIVE MATERIAL AND PROCESS

Jan Hendrik de Boer and Cornelis Johannes Dippel, Eindhoven, Netherlands, assignors to N. V. Philips' Gloeilampenfabrieken, Eindhoven, Netherlands No Drawing. Application March 28, 1931, Serial No. 526,112. In the Netherlands March 29, 1930

2 Claims. (Cl. 95—6)

This invention relates to improvements in the art of photography, and more particularly to a new means and method of obtaining photographic records (contrast effects) or pictures on a sensitized medium by the action of electro-magnetic radiations which are beyond the visible range, and which radiations are known as invisible light rays.

In order to obtain photographic pictures by the action of either visible or invisible light rays it is necessary to produce a contrast effect on a sensitized medium by which the exposed parts of the medium make an optical impression different from that made by non-exposed parts. This contrast effect may be apparent immediately upon exposure, or it may only become apparent after certain operations have been performed upon the sensitized medium subsequent to exposure.

In usual photographic methods, and in order to preserve the capacity for recording contrast effect before the exposure is made as well as the recorded contrast effect resulting from exposure to light rays, a carrier which is provided with a light-sensitive substance (e. g. a photographic plate, paper or film) must be protected from the action, for any appreciable duration, of sunlight, ordinary diffused day-light, or, even from such sources of artificial light as are employed for illumination. For such protection, and as is well known, use has been made of the camera obscura, red light, special enclosures or receptacles and the like. In the prior art relating to photography, it has been proposed to incorporate certain dyes with the light sensitive substance, which dyes are effective to absorb visible light; and also to use desensitizers which act to decrease the sensitivity of the carrier to light rays in the visible range.

The present invention has for its object to provide a carrier with a light sensitive substance which may be used in the photographic art without the necessity of using in connection therewith, any of the various known and above mentioned means for protecting and preserving the contrast effect or capacity of the sensitive medium. Furthermore the present invention provides or makes possible a method of manufacture of carriers with light-sensitive characteristics of the kind described in which the manufacturing steps may be conducted without any special provisions being made to protect the work from the usual and ordinary sources of illumination used in factories, whether this be diffused daylight or artificial illumination. As examples of carriers adapted to put the invention into practice may be mentioned the usual materials, such as glass, celluloid, transparent film, paper and the like, and also glass, celluloid, film, paper or the like provided with a gelatine layer.

According to this invention, a carrier with light sensitive characteristics is provided, which has exclusive sensitivity for certain of the light rays, such that a permanent contrast effect is produced upon exposure of the sensitive medium to rays of the invisible range (such e. g. as ultra-violet, X-rays and infra-red rays) and which contrast effect is not destroyed nor diminished even though the carrier is exposed for an appreciable time to light rays in the visible range, and to air, prior to, during or subsequent to the exposure which has created the desired contrast effect.

The invention is differentiated from the known art by the use of light-sensitive substances which themselves have the desired properties intead of using substances which require treatment in particular ways to make them less sensitive to the visible light rays.

According to this invention, light-sensitive substances are provided capable of making permanent contrast effects by action thereon of the visible light rays of other wave lengths than visible rays to which the substance may be exposed prior to, during, or subsequent to its exposure to the invisible light rays. The above-mentioned carriers may be provided with a light-sensitive substance of this character.

The carrier to be provided with such a light-sensitive substance may be in the form of a plate, film, paper, or similar material. The light-sensitive substance is practically unaffected by (insensible to) visible light such as diffused daylight, but possesses pronounced sensitivity to rays of such length as X-rays, infra-red rays or ultra-violet light. It is obvious that a particular advantage of the invention resides in the fact that in the use of sensitive substances having this exclusive sensitivity, there is no occasion to resort to the use of dark room or to take special care or precautions to avoid exposure of the substance to day-light. Furthermore, it has been found in the practice of this invention, that the materials may be exposed to diffused day-light even for substantial time intervals, either prior to, during or subsequent to exposure to rays for which they have selective sensitivity without destroying or diminishing the capacity of the substance for recording contrast effects when exposed to light of wave lengths other than that of visible light. This characteristic, i. e. exclusive sensitivity is particularly effective if the substance or carrier is possessed of high sensitivity for the so-called "near" ultra-violet light. It is even possible with substances which are selectively sensitive to the so-called "far" ultra-violet light, to expose same to sun light without destroying a recorded contrast effect or the capacity of the substance to record such an effect. The prior art shows a known light-sensitive substance which is sensitive to ultra-violet light and particularly sensitive to the so-called "far" ultra-violet light, and which on exposure to sun-light, becomes blue in color, but with this substance prolonged exposure to visible light apparently destroys the contrast recording property. Thus, paper treated with an aqueous solution of paraphenylene diamine and nitric acid exhibits a particular or marked sensitivity to "far" ultra-violet light, but its ability to record a contrast effect on exposure to such light is apparently lost if unduly exposed to visible light rays.

The present invention then may be said to relate to the art of obtaining photographic contrast effects in or on a sensitized medium by exposure to light rays beyond the visible range, and providing a carrier with a light-sensitive substance the sensitivity of which is selective to the extent that it records permanently a contrast effect upon exposure to the invisible rays.

The carrier is substantially unaffected by exposure for appreciable time to visible light rays and/or air and regardless of whether such exposure is prior to, during or subsequent to the exposure which makes the desired contrast effect.

By the practice of this invention, it is possible to obtain permanent contrast effects which are perceptible to the eye immediately upon exposure to whatever invisible rays may be employed. Such effects may be subsequently reinforced if desired. Also the invention permits of obtaining latent contrast effects or pictures which are made perceptible by a suitable subsequent treatment such as will be described.

The invention, as above described, will be further explained by reference to specific embodiments, the exposition of which, however, should not be to limit the scope of the generic invention but, only to illustrate the same by way of specific example.

Embodiment I

Lead chloride has a particular sensitiveness to ultra-violet light and is not decomposed by daylight.

A carrier provided with a lead chloride layer may be produced, for example, by introducing lead chloride into a colloidal solution of gelatine and spreading the solution on a plate. A different method consists in subliming lead chloride in a vacuum on a glass wall. After the action of ultra-violet light, the contrast effect may be intensified, for example, by developing in mercury vapour.

Embodiment II

When a carrier provided with a gelatine layer is soaked in a solution of mercurous nitrate, a carrier provided with a light-sensitive layer is obtained which is practically insensitive to direct sun-light. By subjecting it, however, to radiation by ultra-violet light for a sufficient length of time, a readily perceptible contrast effect is produced. If it is subjected to such radiation for a shorter length of time a latent picture is produced which can be readily developed. Thus, for example, this latent picture may be developed by means of ferrous sulphate. Even better results are obtained by developing with a solution of silver nitrate and a ferrous sulphate. Thus, for example, a mercurous nitrate-treated gelatine plate after being exposed to sun-light for two days does not produce any picture nor a developable latent picture, whereas such a plate produces a satisfactory latent picture when being subjected to irradiation by ultra-violet light. After the development, any excess of ferrous sulphate or of silver nitrate and ferrous sulphate is removed by washing with water.

Embodiment III

A gelatine plate soaked in lead acetate is sensitive to the so-called "far" ultra-violet light. After a sufficiently long exposure, a direct picture is produced and in the case of a shorter exposure, a latent picture is produced which can be developed quite readily. For this purpose, it is first treated with a solution of silver nitrate, which causes the picture to appear in a silver white color. The treatment is continued with ferrous sulphate which causes the picture to turn from black to red-brown. Again, the carrier is washed with water to remove any excess of salts that may render the plate light-sensitive to visible light.

Embodiment IV

When a coating of zinc sulphite is applied upon a glass plate by volatilization of the substance in a vacuum, an immediate black picture is obtained after subjecting the carrier to ultra-violet light as well as by subjecting it to X-rays.

According to this invention, photographic prints may be obtained by means of ordinary negatives, the printing being effected on a suitable carrier provided with a light-sensitive substance made as described in any of the above embodiments by exposure to invisible light rays.

What we claim is:

1. A carrier provided with a light-sensitive substance that is substantially insensitive to visible light rays, comprising a gelatin coating containing lead acetate.

2. In the method of photographically producing permanent contrast effects the steps comprising, selecting a carrier which includes lead acetate as the light sensitive medium, exposing said carrier and medium to light the predominant wave lengths of which are shorter than those of visible light to record thereon a contrast effect, and subsequently treating the exposed carrier first with a solution of silver nitrate and then with ferrous sulphate to develop the desired visible contrast effect.

JAN HENDRIK DE BOER.
CORNELIS JOHANNES DIPPEL.

CERTIFICATE OF CORRECTION.

Patent No. 2,057,016.  October 13, 1936.

JAN HENDRIK de BOER, ET AL.

It is hereby certified that error appears in the printed specification of the above numbered patent requiring correction as follows: Page 1, second column, line 26-27, for the word "visible" read invisible; line 44, for "room" read rooms; and that the said Letters Patent should be read with these corrections therein that the same may conform to the record of the case in the Patent Office.

Signed and sealed this 8th day of December, A. D. 1936.

Henry Van Arsdale
Acting Commissioner of Patents.

(Seal)